United States Patent [19]

Born et al.

[11] Patent Number: 5,286,395

[45] Date of Patent: Feb. 15, 1994

[54] OLEFIN POLYSULFIDE COMPOSITIONS OF HIGH SULFUR CONTENT AND VERY LOW CHLORINE CONTENT, THEIR MANUFACTURE AND USE AS ADDITIVES FOR LUBRICANTS

[75] Inventors: Maurice Born, Nanterre; Lucienne Briquet, Rueil-Malmaison; Guy Parc, Rueil-Malmaison, all of France

[73] Assignee: Institut Francais du Petrole, Rueil Malmaison, France

[21] Appl. No.: 883,793

[22] Filed: May 14, 1992

Related U.S. Application Data

[63] Continuation of Ser. No. 199,881, May 26, 1988, abandoned.

[30] Foreign Application Priority Data

May 27, 1987 [FR] France .................. 87 07560
Jan. 22, 1988 [FR] France .................. 88 00830

[51] Int. Cl.$^5$ ........................... C10M 135/04
[52] U.S. Cl. ........................... 252/45; 568/18
[58] Field of Search ............... 252/45; 568/18

[56] References Cited

U.S. PATENT DOCUMENTS

| | | |
|---|---|---|
| Re. 31,522 | 2/1984 | Rieder . |
| 3,471,404 | 10/1969 | Myers ................... 252/45 |
| 3,697,499 | 10/1972 | Myers ................... 252/48.8 |
| 4,147,640 | 4/1979 | Jayne et al. ............ 252/45 |
| 4,204,969 | 5/1980 | Papay et al. ........... 252/45 |
| 4,225,488 | 9/1980 | Horodysky et al. .... 252/45 |
| 4,563,302 | 1/1986 | Griffin et al. .......... 252/45 |
| 4,578,202 | 3/1986 | Urban et al. . |
| 4,631,139 | 12/1986 | Burton et al. . |
| 4,645,610 | 2/1987 | Born et al. ............. 252/45 |

OTHER PUBLICATIONS

Hobson et al., *Modern Petroleum Technology*, 4th Ed., pp. 754-755 (1973).

*Primary Examiner*—Jerry D. Johnson
*Attorney, Agent, or Firm*—Millen, White, Zelano & Branigan

[57] ABSTRACT

Olefin polysulfide compositions of high sulfur content and of very low chlorine content are obtained by a process comprising the steps of: (1) reacting sulfur mono- and/or dichloride with at least one aliphatic monoolefin of 2-12 carbon atoms, to form an addition product or "adduct", (2) reacting hydrogen sulfide with an alkali hydroxide or ammonium hydroxide dissolved in at least one substantially anhydrous $C_1$-$C_4$ aliphatic monoalcohol, with optional addition of elemental sulfur, (3) contacting said "adduct" together with at least one monohalogenated hydrocarbon compound, with the alcoholic solution obtained at the end of step (2), (4) heating the resultant mixture from step (3), removing the monoalcohol, while adding water, and (5) after settling and removal of the aqueous phase, recovering the organic phase formed at least in major part of the desired olefin polysulfide composition. These compositions, of sulfur content up to 65% by weight and of chlorine content generally lower than about 0.1% by weight, are used in particular as additives for improving the extreme-pressure properties of lubricants.

20 Claims, 1 Drawing Sheet

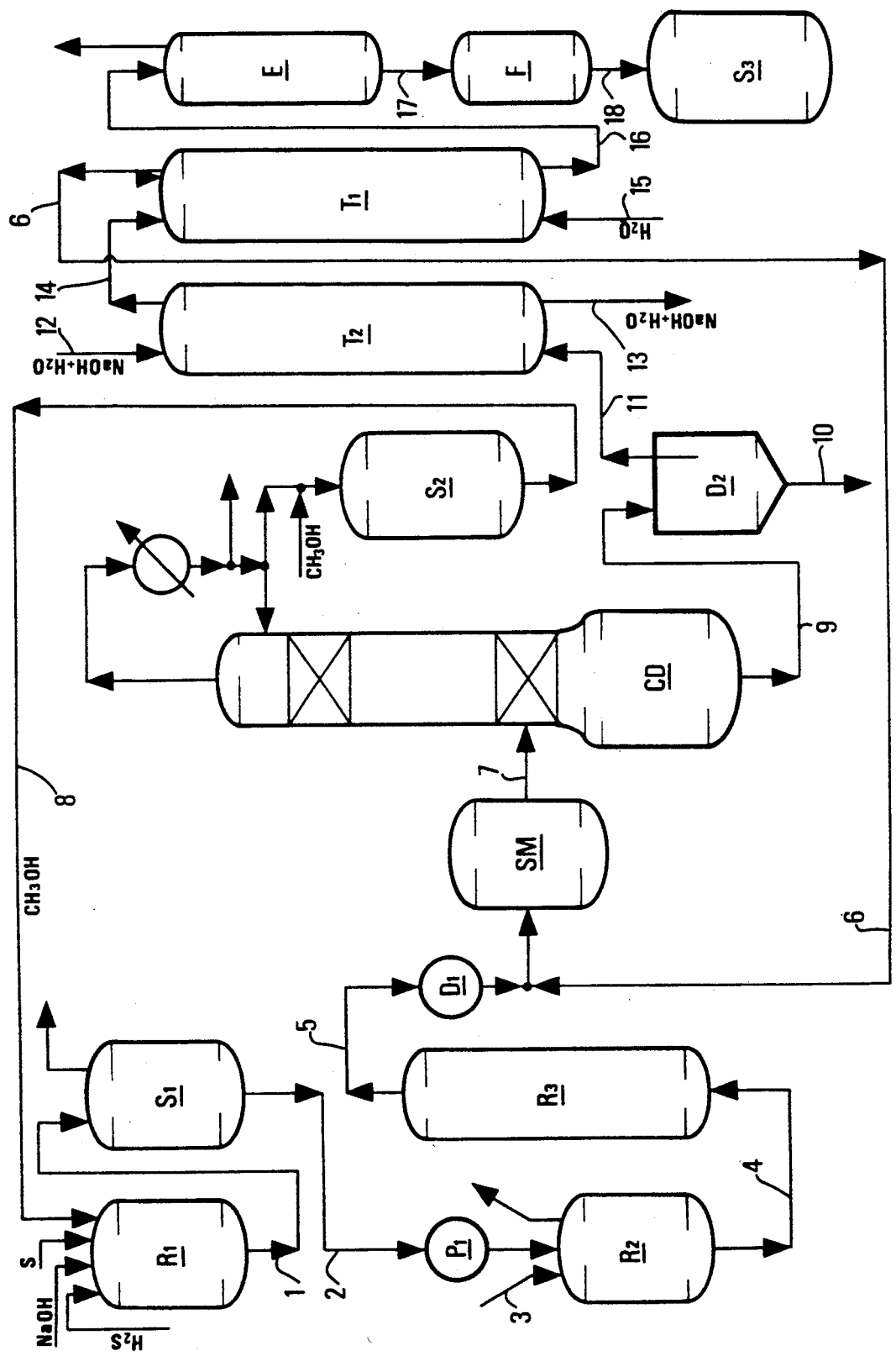

OLEFIN POLYSULFIDE COMPOSITIONS OF HIGH SULFUR CONTENT AND VERY LOW CHLORINE CONTENT, THEIR MANUFACTURE AND USE AS ADDITIVES FOR LUBRICANTS

This application is a continuation of U.S. patent application Ser. No. 07/199,881, filed May 26, 1988, now abandoned.

This invention relates to the field of sulfur-containing organic additives used in particular for improving the extremepressure properties of lubricants. It concerns more particularly new products of the olefin polysulfide type, of high sulfur content and of very low chlorine content, their preparation and use as additives for lubricants.

BACKGROUND OF THE INVENTION

Many processes for preparing polysulfides adapted to be used as extreme-pressure additives for lubricants are disclosed in the prior art.

In particular, U.S. Pat. Nos. 3,471,404 and 3,697,499 disclose a process comprising the following main steps of:

(1) reacting sulfur monochloride with an excess of a $C_2$ to $C_5$ olefin,, particularly isobutene, at a temperature from 20 to 80° C., so as to form an adduct, (2) reacting the adduct of the first step with an alkali metal sulfide (preferably sodium sulfide) and elemental sulfur, in a ratio from 1.8 to 2.2 moles of metal sulfide per gram-atom of sulfur, the proportion of alkali metal sulfide being from 0.8 to 1.2 mole per mole of adduct, and the reaction being performed in the presence of an alcohol or of a hydro-alcoholic solvent, at reflux, and (3) reacting the resultant product, which contains 1-3% of chlorine, with an inorganic base in aqueous solution, at reflux until the residual chlorine content of the product is reduced to less than 0.5%.

These prior art patents indicate that the sulfur content of the obtained products may be from 40 to 60% by weight. In fact, it is usually close to 46% by weight. These products may be used as extreme-pressure additives for lubricating oils, transmission fluids or greases, the lubricating bases consisting of mineral oils and of certain synthetic oils.

U.S. Pat. No. 4,204,969 discloses a rather similar process for preparing olefin polysulfides for use as extreme-pressure additives for lubricating oils. This process comprises the main steps of:

(1) reacting, at about 30-100° C., sulfur monochloride with a $C_3$-$C_6$ aliphatic monoolefin (generally isobutene) preferably in the presence of a promoter consisting of a lower alcohol, so as to form an adduct, (2) reacting said adduct with sulfur and sodium sulfide (prepared for example from NaOH, NaHS and/or $H_2S$) in a ratio of 0.1-0.4 gram-atom of sulfur per mole of sodium sulfide, in a hydroalcoholic medium, at a temperature from 50° C. to reflux temperature, and recovering the resultant product, without treatment by means of a base. The lower alcohol, of 1-4 carbon atoms, is generally present in an amount by weight of 0.1-0.5 parts per part of water.

In the sole example of said patent, it is mentioned that the product has a 49% by weight sulfur content and a viscosity at 100° F. (37.8° C.) of 8.6 mm²/s (cSt), but the analysis indicates that said product has a residual chlorine content of about 0.25% by weight.

It is apparent that the isobutylene polysulfides prepared according to the prior art in reaction media containing substantial amounts of water, always contain residual chlorine amounts higher than 0.1% by weight, the complete removal of chlorine being difficult as a result of the insolubility of the adduct in the reaction medium, which results in an incomplete heterogeneous phase reaction.

In most of the described processes, water is generally introduced into the reaction medium in the presence of a minor amount of alcohol (particularly isopropanol), for dissolving the alkali sulfide, itself mostly containing a substantial amount of (at least 40% by weight for industrial $Na_2S$).

It is however possible to increase the dissolving power of the reaction medium with respect to the adduct by substituting the dissolution water of the hydrated alkali sulfide with a lower alcohol, but the required alcohol amount is then incompatible with satisfactory economical industrial production.

It is further known that, for toxicology and ecology purposes, a new legislation, in course of elaboration, concerning additives for lubricants, will probably prescribe, in the next few years, a maximum chlorine content substantially lower than 0.1% by weight for these products.

SUMMARY OF THE INVENTION

It has now been discovered that it is possible, in economic fashions, to use a reaction medium wherein the adduct is soluble, resulting in an increased reactivity with respect to the alkali polysulfide. This new reaction medium does not result in reaction volumes larger than those required in the prior art and gives olefin (poly)sulfide compositions of very high sulfur contents and very low residual chlorine contents, which can be accordingly advantageously used as additives for lubricants in order to improve, in particular, their extreme-pressure properties.

BRIEF DESCRIPTION OF THE DRAWINGS

FIG. 1 of the accompanying drawing, shows, by way of non limiting example, a flowsheet of an apparatus for carrying out in a continuous manner the manufacturing process according to the invention.

DETAILED DESCRIPTION

Generally, the olefin polysulfide compositions according to the invention may be defined as those obtained by a process comprising the following steps of:

(1) reacting, for example at a temperature of 20-80° C., at least one compound selected from sulfur monochloride and sulfur dichloride, with at least one aliphatic monoolefin of 2-5 carbon atoms, thus forming an addition product (adduct), (2) reacting the hydrogen sulfide with an alkali metal (sodium, potassium) hydroxide or with ammonium hydroxide dissolved in at least one substantially anhydrous $C_1$-$C_4$ aliphatic monoalcohol, to which element sulfur is optionally added, depending on the desired formation of a mixture of sulfide, hydrosulfide and/or alkali metal polysulfide, (3) contacting said adduct or adduct mixture, and together at least one monohalogenated saturated or unsaturated hydrocarbon compound, as hereinafter defined, with the alcoholic solution obtained at the end of step (2), maintained at a determined temperature, for example from 20 to 120° C., during the introduction of the reactants, optionally under pressure, (4) heating the resultant mixture for a given time, at a temperature for example from 50° C to reflux temperature, then removing the monoalcohol by distillation, while adding a sufficient water amount to maintain in solution the reactants and the inorganic products formed (essentially alkali metal or ammonium chloride)

(5) after settling, removing the aqueous phase and recovering the organic phase formed of the olefin polysulfide, and (6) optionally treating the obtained product with a basic compound such as an inorganic base, and washing the product with water.

In step (1) of the process according to the invention, the starting olefins may contain 2-5 carbon atoms and may be used either alone or as mixtures. Isobutylene is mostly used. It may also be considered to use these olefins in admixture with minor proportions of olefins having more than 5 carbon atoms (e.g diisobutylene).

The olefin may be used in a proportion from 1.5 to 2.5 moles, preferably 1.8-2.2 moles per mole of sulfur monochloride and/or dichloride. It is generally introduced into liquid sulfur monochloride and/or dichloride at a temperature of 20 to 80° C., more particularly of 30 to 50° C. This step is performed in an anhydrous medium.

The sulfur compound prepared in step (2) may be used in the proportions of an alkali metal or ammonium sulfide a hydrosulfide and/or an alkali metal (e.g sodium or potassium) or ammonium polysulfide or a mixture thereof.

Sodium compounds are the most usual. Generally hydrogen sulfide is used in an amount of 0.1-1 mole, preferably 0.3-0.7 mole per mole of hydroxide.

It is of course possible to use a higher proportion of hydrogen sulfide, but the effective proportion of hydrogen sulfide is not accordingly necessarily increased, the unreacted amount being then released.

Elemental sulfur, optionally involved in step (2), together with the sulfur compound, may be in a molar ratio with the introduced hydroxide ranging from 0 to about 3.6/1, more particular from 0 to 2.5/1.

In step (2) the sulfur compound is formed and optionally elemental sulfur is introduced into a substantially anhydrous light aliphatic monoalcohol of 1-4 carbon atoms.

Examples of lower aliphatic monoalcohols are : methanol, ethanol, n-propanol, isopropanol, n-butanol, isobutanol and tert-butanol, methanol being preferred. The amount involved is advantageously from 100 to 400, preferably from 125 to 200 cc per mole of hydroxide.

By "substantially anhydrous aliphatic monoalcohol," according to the invention, it is meant an aliphatic monoalcohol containing at most 10% by weight of water, preferably less than 5% by weight of water. For methanol, which is preferred, a substantially pure product containing more than 99.9% of methanol may be used.

In step (3) of the process, the one or more saturated and/or unsaturated monohalogenated hydrocarbon compounds used jointly with the adduct obtained at the end of step (1) may consist of chlorides, bromides or iodides of $C_1$–$C_{12}$ (preferably $C_2$–$C_4$) linear or branched alkyls or alkenyls, cycloalkyls and/or cycloalkenyls, optionally substituted, containing 5 to 12 (preferably 6) carbon atoms or of $C_6$–$C_{12}$ (preferably $C_8$–$C_9$) arylalkyls and/or arylalkenyls, optionally substituted.

Particular examples are methyl, ethyl, isopropyl, n-propyl, tert-butyl, isobutyl, n-butyl, tert-amyl, isoamyl, n-amyl n-hexyl, 2-ethylhexyl, n-octyl, cyclohexyl and benzyl chlorides, bromides and iodides and mixtures thereof.

Further examples are 1-chloroethylene, 1-chloropropene, 2-chloropropene, 3-chloropropene, 1-chloro 1-butene, 1-chloro 2-butene, 2-chloro 2-butene, 3-chloro 1-butene, 1-chloro 2-methylpropene, 3-chloro 2-methylpropene or 3-chloro 1-phenyl 1-propene, 2-chlorothiophene, as well as the corresponding bromine and iodine derivatives.

Advantageously n-butyl chloride and methallyl chloride are used. (methallyl chloride is 3-chloro 2-methyl-propene).

It is also possible, without departing from the scope of the invention, to at least partly replace the monohalogenated hydrocarbon compound as above-defined with at least one monohalogenated hydrocarbon compound further comprising at least one functional group containing one or more heteroatoms (such as oxygen and/or nitrogen and/or sulfur).

Among these functional monohalogenated hydrocarbons, the monochlorinated or monobrominated compounds will be mainly used. They are advantageously selected from:

monohalogenated compounds containing at least one alcohol group, particularly:

aliphatic, alicyclic or aromatic-aliphatic monoalcohol halides containing for example 2-18 carbon atoms, such as for example 2-chloro and 2-bromo ethanols, chloro- and bromo-propanols, butanols, pentanols, hexanols, heptanols, octanols, nonanols, decanols, undecanols and dodecanols, chloro-or bromo-benzyl alcohols and chloro-or bromo-phenylethyl alcohols, polyol halides such for example as 3-chloro or 3-bromo 1,2-propanediol (and the corresponding epoxy derivatives, for example 1-chloro or 1-bromo 2,3-epoxypropane), (poly-) oxyalkyl monoalcohol halides, such for example as chloro- and bromo- (poly-)ethoxyethanols, (poly-)ethoxypropanols, (poly-)propoxyethanols and (poly-)propoxypropanols, monohalogenated compounds containing at least one phenol group, such for example as chloro- and bromo-phenols, unsubstituted or substituted for example with alkyl groups, monohalogenated compounds comprising at least one carboxylic group, such for example as chloro- and bromo- acetic, propionic, butyric, valeric, benzoic and succinic acids, monohalogenated compounds containing at least one amine group particularly aliphatic, alicyclic or aromatic-aliphatic compounds such for example as chloroethylamine chlorhydrate and chloro-N,N dimethyl-, diethyl- and dipropyl-ethylamine chlorhydrates chloro- and bromo- benzylamines and chloro- and bromophenyl ethylamines, monohalogenated compounds comprising at least one amide group such for example as chloro- and bromo-acetamides and propionamides, or monohalogenated compounds comprising at least one thiol group such for example as chloro- and bromo-mercaptobenzothiazoles chloro- and bromo- phenylmercaptans and chloro- and bromo-benzylmercaptans.

Examples of monohalogenated functional compounds comprising groups of several different types are:

compounds with hydroxyl and carboxylic acid groups, such for example as 5-chlorosalicylic acid or 3-chloro 4-hydroxymandelic acid, compounds with amine and carboxylic acid groups, such for example as 4-chlorophenylalanine, or compounds with hydroxyl and amine groups.

These functional monohalogenated hydrocarbon compounds may be used jointly with non functional monohalogenated hydrocarbon compounds such as above defined, and in any proportion, without departing from the scope of the invention.

Hereinafter, the term "monohalogenated hydrocarbon compounds" will be used indifferently to designate generally the involved nonfunctional and functional compounds or mixtures thereof.

When, in step (3) of the process according to the invention, at least one functional monohalogenated compound such as above defined is used, the reaction of this step is advantageously conducted in the presence of a small amount (e.g from 0.1 to 10% by weight) of at least one catalyst adapted for promoting phase transfer, particularly a quaternary ammonium halide (for example tetrabutylammonium chloride), or an alkyl phosphonium halide, or a "crown-ether" (or cryptate).

The monohalogenated hydrocarbon compound is generally used in an amount of 1–70% of halogen gram-atoms in proportion to the total number of halogen gram-atoms of the adduct or "adduct + monohalogenated hydrocarbon compound" mixture. This proportion generally corresponds to a number of moles of monohalogenated hydrocarbon compound from about 0.015 to 1.9 per 100 g of adduct, particularly when the starting olefin is isobutylene.

The proportion of adduct and of monohalogenated hydrocarbon compound with respect to the involved hydroxide generally corresponds to 1/1–0.5/1, preferably 0.85/1–0.75/1 halogen atoms per mole of hydroxide.

Step (3) may be conducted under a low over pressure; the relative pressure may reach for example 1 MPa (10 bars).

The additives according to the invention may also be prepared by a process operating continuously with parallel streams and multiple contacts, the reaction of step (3) being generally conducted under pressure.

Such an embodiment will be described more in detail in example 12 with reference to the accompanying drawing FIG. 1.

The olefin polysulfide compositions according to the invention may have a sulfur content up to about 65% by weight, for very low residual chlorine contents, generally lower than about 0.1% by weight, mostly lower than 0.05% and sometimes as low as about 0.01% by weight, particularly when using methanol and/or a light reaction over pressure.

The products according to the invention, of sulfur content lower than 50% by weight, are sufficiently soluble in mineral oils to be used as component of antiwear and extreme-pressure gear oils.

The products according to the invention, of sulfur content higher than 50% and up to 65% by weight, are less soluble in mineral oils, but their solubility is still sufficient for the applications to which they are destined (metal-working oils for example). In addition, they are completely soluble in usual oil solvents such as white-spirit or in oil cuts of the aromatic type.

The invention is applicable to olefin polysulfide compositions as above defined but deriving from at least one $C_6$–$C_{12}$ olefin, mostly diisobutylene, hexenes, nonenes or decenes. These olefins may also be used in admixture with a minor proportion of $C_2$–$C_5$ olefins (e.g isobutylene).

All the above operating indications are still applicable in this aspect of the invention. It must be however specified that:

the preferred molar ratio of element sulfur to the hydroxide is from 0 to 3.5/1, and that the aliphatic monoalcohol is used in a preferred amount from 125 to 400 cc per mole of hydroxide.

In addition, the proportion of monohalogenated hydrocarbon compound, which is usually from 1 to 70% as halogen gram-atoms in proportion to the total number of halogen gram-atoms of the assembly : adduct (or adduct mixture)+monohalogenated hydrocarbon compound, corresponds to about 0.01–1.9 mole per 100 g of adduct(s), particularly when the starting monoolefin is diisobutylene.

In this aspect of the invention, the olefin polysulfide compositions have generally a sulfur content up to about 50% by weight and particularly low residual chlorine contents, generally lower than about 0.1% by weight, mostly lower than 0.05% and sometimes even as low as about 0.02% by weight.

As a general rule, the olefin polysulfide compositions of the invention having a corrosivity in regard to copper lower than 3 at 121° C. according to Standard ASTM D 130 (the proportion of olefin polysulfide composition corresponding to a 2% by weight sulfur content with respect to the oil) may be used as component of antiwear extreme-pressure gear oils and of copper-metal-cutting oils.

The olefin polysulfide compositions of the invention whose corrosivity in regard to copper is at least 3 at 121° C. according to Standard ASTM D 130 (under the same conditions as above may be used as components of iron metal-cutting oils.

EXAMPLES

The following examples are given to illustrate the invention without limiting the scope thereof. Example 1A is given by way of comparison.

Example 1

A 10 liter reactor, provided with a stirrer, is fed with 2700 g of sulfur monochloride $S_2Cl_2$(20 moles) and then, through a dip tube, under the permanently stirred $S_2Cl_2$ surface, with 2530 g of isobutylene (48.7 mole) wherein 25 g of methanol have been previously dissolved. The temperature of the reaction medium is maintained between 45 and 50° C. during the whole time of isobutylene introduction (1 hour). 5000 g of addition product called "adduct", are thus obtained.

98 g of sodium hydroxide pellets (2.45 moles) and 400 cc of anhydrous methanol are introduced into a second reactor of 1 liter capacity, provided with a stirrer and surmounted by a system for distillation, and the mixture is then stirred up to complete dissolution.

41.65 g of hydrogen sulfide (1.225 mole) are introduced in 1 hour, through a dip tube into the alcohol phase, the reaction mixture being maintained at about 50° C. by external cooling.

Then 14.52 g of sulfur flower (0.45 g at) are added to the medium and the mixture is heated under stirring to methanol reflux temperature for 1 hour, so as to favor the formation of sodium polysulfide.

A mixture formed of 230 g of adduct and 15 g (i.e about 16.2 $10^{-2}$ mole) of n-butyl chloride is introduced in 2 hours, through an addition funnel, into the sodium polysulfide alcoholic solution, the reaction temperature being regulated by reflux of boiling methanol.

After 7 hours of reaction at reflux, methanol is progressively removed by distillation and simultaneously 350 cc of water are progressively introduced into the boiling mixture.

After complete distillation of methanol, the hot upper organic phase is separated from the aqueous phase containing the formed NaCl and the sodium polysulfide excess.

The organic phase is treated at reflux under stirring for 3 hours with 200 g of a 10% by weight aqueous sodium hydroxide solution.

After settling, the recovered organic phase is washed twice with 200 cc of water, dried over anhydrous $Na_2SO_4$ and filtered. A yellow-orange liquid (168 g), whose characteristics are indicated in table 1, is recovered.

The optional mutagenic power of the product obtained in this example has been subjected to the micronucleus test on mice at a dose of 5000 mg/kg.

The animals (5 males and 5 females per group) have received two intraperitoneal injections at 24 hour interval and have then been sacrificed 6 hours after the second injection. For each animal 1000 polychromatophile erythrocytes originating from the femoral medulla have been observed.

In the prevailing experimental conditions, it appears that the product has not induced any mutagenic effect.

Example 1A 90 g of an aqueous solution containing 32.1% by weight of sodium hydrogen sulfide and 41.3 g of a 50% by weight sodium hydroxide aqueous solution are introduced into a reactor.

44.4 g of isopropanol and 2.9 g of sulfur flower are then added to this mixture. After stirring for 5 minutes, 55.1 cc of water are added and the mixture is heated to 75° C. Then 105 g of isobutylene/$S_2Cl_2$ adduct (Cl=27.9% by weight) are added dropwise to this mixture in 2 hours. The stirred mixture is then brought to reflux temperature for 4 hours.

Isopropanol is then distilled up to 90° C. under atmospheric pressure, then under reduced pressure so as to remove the last isopropanol traces and the major part of water.

The recovered sulfur-containing organic phase is washed with 68 g of distilled water so as to remove the formed salt, and a second time with a mixture comprising 68 g of water and 34 g of hexane, while bringing the stirred mixture to reflux for 0.5 hours.

After settling, the aqueous phase is discharged and the organic phase is evaporated so as to remove hexane. The obtained raw product is filtered for obtaining an additive whose main physico-chemical characteristics are as follows :
S=48.6% by weight,
Cl=2 550 ppm.

Example 2

Example 1 is repeated except that methanol is replaced by the same volume of absolute ethanol. After reaction, treatment with sodium hydroxide and recovery treatments, an orange liquid (160 g), whose characteristics are summarized in table 1, is recovered.

Example 3

Example 2 is repeated except that ethanol is replaced by the same volume of isopropanol. A yellow-orange liquid (140 g), whose characteristics are indicated in table 1, is recovered.

Example 4

Example 1 is repeated with the use of 98 g (2.45 moles) of sodium hydroxide as pellets and of 41.65 g of $H_2S$ (1.225 mole), but without using any sulfur flower. After reaction with the chlorinated mixture (230 g of adduct+15 g of n-butyl chloride) and after methanol distillation, the recovered sulfurcontaining organic phase is washed, dried and filtered without previous treatment with 10% sodium hydroxide. Thus, a yellow orange liquid (168 g), whose characteristics are indicated in table 1, is recovered.

Example 5

Example 4 is repeated but with the use of 57 g of $H_2S$ (1.67 mole). An orange-yellow liquid (168 g), whose characteristics, close to those of the additive obtained in example 4, as indicated in table 1, is recovered.

Example 6

Example 1 is repeated with the use of 98 g (2.45 moles) of sodium hydroxide as pellets, 41.65 g of $H_2S$ (1.225 mole), 39.3 g of sulfur flower, 400 cc of methanol and a mixture of 215 g of adduct and 30 g of n-butyl chloride. After reaction and treatment with 10% sodium hydroxide, a liquid (195 g) of orangeyellow color, whose characteristics are reported in table 1, is recovered.

Example 7

Example 6 is repeated with the use of 98 g (2.45 moles) of sodium hydroxide as pellets, 41.65 g of $H_2S$ (1.225 mole), 152 g of sulfur flower (4.75 g.at), 400 cc of methanol and an halogenated mixture formed of 110 g of adduct and 105 g of n-butyl chloride. After reaction and then distillation of methyl alcohol, the recovered sulfur-containing organic phase is washed, dried and filtered without previous treatment with sodium hydroxide. Thus an orange liquid (218.7 g), whose characteristics are indicated in table 1, is recovered.

Example 8

In the experimental conditions of example 1, the halogenated mixture is reacted with the alcoholic solution of sodium polysulfide for 16 hours. After treatment, the obtained additive (163 g) has the characteristics indicated in table 1.

Example 9

Example 1 is repeated except that the reaction is conducted under a pressure of 3 absolute bars (0.3 MPa) so as to maintain for 7 hours the temperature of the halogenated mixture reaction with the alcoholic sodium polysulfide at about 105° C. After treatments, the obtained additive (167 g) has the characteristics summarized in table 1.

Example 10

Example 1 is repeated except that n-butylchloride is replaced by the same molar amount of 3-chloro 2-methylpropene (14.7 g). The additive (167 g), obtained after treatments, has the characteristics indicated in table 1.

Example 11

Example 1 is repeated with the use of a halogenated mixture formed of 162.5 g of adduct and 65.6 g of 1-chloro 2,3-epoxypropane (0.71 mole).

After 7 hours of reflux, the mixture is cooled and 200 cc of toluene are added thereto for extracting the sulfur-containing additive. After stirring and settling, the recovered organic phase is washed twice with 200 cc of distilled water, dried over anhydrous $Na_2SO_4$, filtered and evaporated under reduced pressure for removing toluene. A viscous brown liquid (157g), whose infrared analysis indicates the presence of the alcohol group and the absence of ether group, is thus recovered. The physico-chemical characteristics of the product are as follows:
S % by weight=41;
Cl % by weight=0.12; IOH=120;
kinematic viscosity at 100° C. $(mm^2/s)$=26;
Solubility in:
  100 Neutral Solvent oil : insoluble;
  benzene, toluene, xylene : soluble;
  acetone : soluble.

Example 12

This example describes an operating mode for producing continuously underalow over pressure an additive containing about 46% by weight of sulfur and having a residual chlorine content of 0.025% by weight.

In order to prepare a sodium polysulfide alcoholic solution, 21.83 parts by weight of methanol, 6.75 parts of sodium hydroxide as pellets, 2.69 parts of $H_2S$ and 1 part of sulfur flower are introduced into a reactor $R_1$. The mixture, heated at 70° C., is then transferred through line 1 to storage vessel $S_1$, for the manufacture of the next polysulfide charge.

The sodium polysulfide alcoholic solution is withdrawn from storage vessel S1 and then fed to reactor $R_2$ through line 2 and pump $P_l$ (under a pressure of 2 bars), at a rate of 2.36 parts by weight per hour. Simultaneously, 1.23 part/hour of a halogenated mixture, formed of one part by weight of n-butyl chloride per 15.33 parts of adduct , is introduced into reactor $R_2$, through line 3.

After an average residence time of 2 hours, the reaction mixture, heated at 105° C. under stirring, is continuously withdrawn from reactor $R_2$ and transferred through line 4 to the bottom of reactor $R_3$ (of "piston" type) wherein the reaction is completed at said temperature of 105° C., after an average residence time of 5 hours. The reaction mixture, discharged from the top of reactor $R_3$ through line 5 and expanded at atmospheric pressure(expander $D_1$), is fed to a static mixer SM, wherein is simultaneously introduced 1.75 part/h of water originating from the washing tower $T_1$, through line 6.

The obtained mixture is transferred through line 7 to a distillation column CD, from the top of which methanol is withdrawn and recovered in a storage vessel $S_2$, wherefrom, after make-up, methanol is recycled through line 8 to reactor $R_1$ for manufacturing the sodium polysulfide alcoholic solution.

The raw sulfur-containing additive, admixed with an aqueous solution containing the sodium polysulfide excess, sodium chloride and methanol traces, is conveyed from the bottom of the distillation column through line 9 to a settler $D_2$ where the two liquid phases are separated at a temperature of 90° C.

The aqueous phase is discharged from the bottom of the settler, through line 10. The raw sulfur-containing additive is fed from the upper part of settler $D_2$ through line 11 to the bottom of extraction tower $T_2$, where it is counter-currently contacted with a 10% by weight sodium hydroxide aqueous solution, supplied through line 12 at a flow rate of 1 part/hour. The temperature in tower $T_2$ is 100° C.

The heavy phase, formed of the sodium hydroxide aqueous solution and of sodium polysulfide, is discharged from the bottom of the reactor through line 13.

The light phase formed by the washed sulfur-containing additive, passes in overflow, through line 14, to the top of washing tower $T_1$ where it counter-currently contacts an upward flow of 1.75 part of water fed through line 15. The temperature in tower $T_1$ is 90° C.

The light aqueous phase, recovered from the top of the washing tower, is conveyed through line 6 to the static mixer SM, as above indicated.

The heavy phase, formed by the washed sulfur-containing additive, is withdrawn from the bottom of tower $T_1$ and supplied through line 16 to evaporator E, wherein the water traces and the light constituents are removed under reduced pressure, at a temperature of 100° C.

The dry additive, recovered from the bottom of evaporator E, is supplied, through line 17 and after passage through filter F, to storage vessel $S_3$, through line 18.

The characteristics of the obtained additive are reported in table 1.

Table 1 indicates, on the one hand, the molar proportions of the involved reactants, expressed in proportion to the sodium hydroxide amount (symbol Cl representing in chlorine gramatoms, the total amount of adduct and of monohalogenated hydrocarbon compound) and, on the other hand, certain characteristics of the obtained products.

TABLE 1

| Additive of example | Preparation Molar ratios between the involved reactants | | | Obtained product | | |
|---|---|---|---|---|---|---|
| | Cl/NaOH | $H_2S$/NaOH | S/NaOH | Additive sulfur content (% b.w.) | Residual chlorine in additive (% b.w.)* | Kinematic viscosity at 100° C. $(mm^2/s)$ |
| 1 | 0.83 | 0.50 | 0.184 | 46.5 | 0.026 | 16.9 |
| 2 | 0.83 | 0.50 | 0.184 | 43.2 | 0.040 | 16.1 |
| 3 | 0.83 | 0.50 | 0.184 | 37.4 | 0.11 | 15.4 |
| 4 | 0.83 | 0.50 | 0 | 47.2 | 0.025 | — |
| 5 | 0.83 | 0.68 | 0 | 47.3 | 0.025 | 15.3 |
| 6 | 0.83 | 0.50 | 0.184 | 47.2 | 0.031 | 12.7 |
| 7 | 0.83 | 0.50 | 1.939 | 63.8 | 0.0125 | 12.3 |
| 8 | 0.83 | 0.50 | 0.184 | 46.4 | 0.014 | 11.4 |

TABLE 1-continued

| Additive of example | Preparation Molar ratios between the involved reactants | | | Obtained product | | |
|---|---|---|---|---|---|---|
| | Cl/NaOH | H$_2$S/NaOH | S/NaOH | Additive sulfur content (% b.w.) | Residual chlorine in additive (% b.w.)* | Kinematic viscosity at 100° C. (mm$^2$/s) |
| 9 | 0.83 | 0.50 | 0.184 | 46.6 | 0.012 | 14.2 |
| 10 | 0.83 | 0.50 | 0.184 | 46.5 | 0.026 | 15.2 |
| 12 | 0.83 | 0.50 | 0.184 | 46.3 | 0.025 | 15.5 |

*Determination by X-ray fluorescence

Example 13

650 g (5.8 moles) of diisobutylene are introduced into a reactor of 1 liter capacity, provided with a stirrer and a cooler. Then, under stirring, 371.8 g of S$_2$Cl$_2$ (2.75 moles) are added dropwise in 1 hour, while maintaining the reaction temperature below 45° C.

At the end of the reaction, 900 g of an addition product, called "adduct" (Cl=15.4% by weight), are recovered.

400 cc of anhydrous methanol and 41 g of sodium hydroxide as pellets (1.03 mole) are introduced into a second reactor of 1 liter capacity, provided with a cooler, a stirrer and a distillation device. The mixture is stirred up to complete dissolution of sodium hydroxide, and then a stream of 17.47 g of H$_2$S gas (0.513 mole) is introduced, through a dip tube, under the liquid surface, in 1 hour, the reaction mixture being maintained at about 50° C. by external cooling.

Then 6.1 g of sulfur flower (0.19 g-at) are added to the medium and the mixture is heated under stirring at methanol reflux temperature for 1 hour so as to favor the formation of sodium polysulfide.

A halogenated mixture formed of 198 g of S$_2$Cl$_2$/diisobutylene adduct, as previously prepared and 6.9 g of n-butyl chloride is introduced through an addition funnel (introduction time : 2 hours), the reaction temperature being regulated by boiling methanol reflux.

The reaction at methanol reflux is continued for 7 hours and then methanol is progressively removed by distillation, whereas, concomitantly, 350 cc of water are progressively introduced into the boiling medium.

After complete distillation of the methanol, the hot organic phase is separated from the aqueous phase containing the formed NaCl and the sodium polysulfide excess.

The organic phase is treated at reflux, under stirring, for 3 hours, with 200 cc of a 10% by weight sodium hydroxide aqueous solution.

After settling, the recovered organic phase is washed twice with 200 cc of water, dried over anhydrous Na$_2$SO$_4$ and filtered. A yellow liquid (164 g) whose characteristics are indicated in table 2, is thus recovered.

Example 14

Example 13 is repeated with the use of a halogenated mixture formed of 94.50 g of diisobutylene/S$_2$Cl$_2$ adduct and 48.4 g of n-butyl chloride and a sodium polysulfide prepared in 400 cc of anhydrous methanol from 41 g of sodium hydroxide (1.03 mole 17.47 g of H$_2$S gas (0.513 mole) and 109.7 g of sulfur flower (3.42 g-at).

After reaction and distillation of methyl alcohol, the recovered organic phase is directly washed with water, without previous treatment with sodium hydroxide, dried over anhydrous Na$_2$SO$_4$ and filtered. An orange yellow oil (146 g) whose characteristics are indicated in table 2, is thus recovered.

Example 15

400 g of an olefin cut formed of 85% by mole of hexenes and 15% by mole of nonenes (olefin cut obtained by propylene dimerization according to DIMERSOL process, called "Dimate") are introduced into a reactor of 1 liter capacity. Then 309 g of S$_2$Cl$_2$ (2.284 moles) are added dropwise thereto in 1 hour while maintaining the temperature to at most 30° C.

After reaction, 665 g of an addition product called "adduct" (Cl=23.8% by weight) are recovered.

The experiment is continued in a second reactor by using a sodium polysulfide prepared as in example 13, and an halogenated mixture formed of 125 g of Dimate/S$_2$Cl$_2$ adduct and 6.9 g of n-butyl chloride.

After reaction and treatment with 10% sodium hydroxide the resultant product is washed twice with 200 cc of water, dried over anhydrous Na$_2$SO$_4$ and filtered. A yellow oil (90 g), whose characteristics are indicated in table 2, is recovered.

Example 16

Example 13 is repeated with the use in the first reactor of 200 g of a C$_9$ (tripropylene) olefin cut (1.59 mole) and of 102 g of S$_2$Cl$_2$ (0.86 mole).

After reaction, 283 g of an addition product called "adduct" (Cl=16.4% by weight) are recovered.

An halogenated mixture consisting of 185.7 g of tripropylene/S$_2$Cl$_2$ adduct and 6.9 g of n-butyl chloride are dropwise introduced in 2 hours into a second reactor of 1 liter capacity containing a sodium polysulfide prepared from 41 g of sodium hydroxide (1.03 mole), 17.47 g of H$_2$S gas (0.513 mole), 91.6 g of sulfur flower (2.86 g-at) and 400 cc of anhydrous methanol.

After reaction and distillation of methyl alcohol, the organic phase is recovered and treated as in example 14. An orange liquid (170 g) whose characteristics are summarized in table 2, is thus recovered.

Example 17

150 g of diisobutylene (1.34 mole) wherein are dissolved 26.3 g (0.5 mole) of isobutylene, are introduced into a reactor of 1 liter capacity, provided with a stirrer. 114 g of S$_2$Cl$_2$ (0.85 mole) are then introduced dropwise, through an addition funnel, while maintaining the reaction temperature at about 20° C.

After reaction, 260 g of addition product called "adduct" (Cl=17.8% by weight) are recovered.

300 cc of anhydrous methanol, 41 g of sodium hydroxide (1.03 mole), 17.47 g of H$_2$S gas (0.513 mole) and 16.45 g of sulfur flower (0.513 g-at) are successively introduced into a second reactor of 1 liter capacity, provided with a stirrer, a cooler and a distillation device.

After formation of the alkaline polysulfide, a mixture formed of 148.8 g of diisobutylene/isobutylene/$S_2Cl_2$ adduct and 17.25 g of n-butyl chloride is introduced dropwise into the medium (introduction time : 2 hours).

The reaction is performed for 7 hours at methanol reflux and then the operation is continued as in example 13.

After settling and without treatment by 10% sodium hydroxide, an orange liquid (122 g), whose characteristics are indicated in table 2, is recovered after drying and filtration.

Example 18

400 cc of anhydrous methanol, 41 g of sodium hydroxide (1.03 mole), 17.47 g of $H_2S$ gas (0.513 mole) and 8.22 g of sulfur flower (0.257 g-at) are successively introduced into a reactor of 1 liter capacity, provided with a stirrer, a cooler and a distillation device.

After formation of sodium polysulfide, a mixture formed of 107.5 g of adduct ex-diisobutylene as prepared in example 13, of 62.5 g of adduct ex-Dimate prepared as in example 15 an of 6.9 g of n-butyl chloride is added dropwise under stirring (introduction time : 2 hours).

The experimentation, continued as in example 13, gives, after treatments, a yellow liquid (124 g) whose characteristics are indicated in table 2.

TABLE 2

| Additive of example | Preparation Molar ratios between the involved reactants | | | Obtained product | | |
|---|---|---|---|---|---|---|
| | Cl/NaOH | $H_2S$/NaOH | S/NaOH | Additive sulfur content (% b.w) | Residual chlorine in additive (% b.w) | Kinematic viscosity at 100° C. ($mm^2/s$) |
| 13 | 0.909 | 0.5 | 0.249 | 30.5 | .0210 | 9.2 |
| 14 | 0.909 | 0.5 | 3.320 | 45.7 | .0200 | 8.7 |
| 15 | 0.909 | 0.5 | 0.249 | 39.8 | .0197 | 11.5 |
| 16 | 0.909 | 0.5 | 2.777 | 44.0 | .0240 | 8.8 |
| 17 | 0.909 | 0.5 | 0.498 | 37.6 | .0214 | 13.4 |
| 18 | 0.909 | 0.5 | 0.250 | 34.5 | .0222 | 8.1 |

*Determination by X-ray flourescence

SOLUBILITY OF THE ADDITIVES OF THE INVENTION

The solubility of the additives prepared according to examples 1 to 12 is measured at 20° C. in a SAE 90 mineral oil and in white-spirit at a concentration of 5% by weight. The results are summarized in table 3 below:

TABLE 3

| Additive of example | Sulfur content (% b.w) | Solubility after 15 days in | | |
|---|---|---|---|---|
| | | SAE 90 mineral oil | | white-spirit |
| | | 20° C. | 5° C. | 20° C. |
| 1 | 46.5 | Soluble | Soluble | Soluble |
| 2 | 43.2 | Sol | Sol | Sol |
| 3 | 37.4 | Sol | Sol | Sol |
| 4 | 47.2 | Sol | Sol | Sol |
| 5 | 47.3 | Sol | Sol | Sol |
| 6 | 47.2 | Insol | Insol | Sol |
| 7* | 63.8 | Insol | Insol | Sol |
| 8 | 46.4 | Sol | Sol | Sol |
| 9 | 46.6 | Sol | Sol | Sol |
| 10 | 46.5 | Sol | Sol | Sol |
| 12 | 46.3 | Sol | Sol | Sol |

*Insoluble at 5% by weight in SAE 90 Soluble in any proportion in white-spirit and in aromatic oil cuts.

MEASUREMENT OF THE CORROSIVE ACTIVITY OF THE PRODUCTS ACCORDING TO THE INVENTION

Corrosion tests with copper blade are conducted according to Standard ASTM D 130 (NF M 07-015), from a SAE 90 mineral oil containing an additive amount corresponding to a sulfur content of 2% by weight.

The results are summarized in tables 4 and 5 hereinafter. They are expressed by a mark comprising a number from 1 to 4, followed with a letter indicating the shape of the copper blade corrosion.

TABLE 4

| Additive of example | [S] in additive (% b.w) | 3 hours at | |
|---|---|---|---|
| | | 100° C. | 121° C. |
| 1 | 46.5 | 1a | 1b |
| 2 | 43.2 | 1a | 1b |
| 3 | 37.4 | 1a | 1b |
| 4 | 47.2 | 2a | 2b |
| 5 | 47.3 | 2a | 2b |
| 6 | 47.2 | 2b | 3b |
| 7 | 63.8 | 3c | 4c |
| 8 | 46.4 | 1a | 1b |
| 9 | 46.6 | 1a | 1b |
| 10 | 46.4 | 1a | 1b |
| 12 | 46.3 | 1a | 1b |

TABLE 5

| Additive of example | [S] in additive (% b.w) | 3 hours at | |
|---|---|---|---|
| | | 100° C. | 121° C. |
| 13 | 30.5 | 1a | 1b |
| 14 | 45.7 | 4c | — |
| 15 | 39.8 | 1a | 1b |
| 16 | 44.0 | 4c | — |
| 17 | 37.6 | 4c | — |
| 18 | 34.6 | 1a | 1b |

In the composition of gear oils for cars and of copper metal-working oils, preferred additives are those having a mark lower than 3 (particularly at 121° C.). The products prepared according to the invention, preferentially those resulting in high corrosion marks, for example those obtained in examples 6, 7, 14, 16 and 17, can be used in the composition of iron metal working oils.

VALUATION OF EXTREME-PRESSURE PROPERTIES OF THE ADDITIVES ACCORDING TO THE INVENTION

Tests have been conducted making apparent the extremepressure properties of the additives according to the invention both in compositions of gear oil type (A) and in compositions of metal-working oils (B).

A1) Additives of examples 1, 8, 9, 10 and 12 have been tested with a 4-ball machine according to the procedures of ASTM D 2266 at a concentration of 1.5% by weight in SAE 90 oil. The results are summarized in table 6.

TABLE 6

| Additive of example | Load-wear index | | Welding load | | Print diameter of balls 1 h under 40 kgf (392.4 N) (mm) |
|---|---|---|---|---|---|
| | (Kgf) | (N) | (Kgf) | (N) | |
| none | 22.2 | 217.8 | 160 | 1569.6 | 0.80 |
| 1 | 63.4 | 621.9 | 400 | 3924.0 | 0.62 |
| 8 | 62.5 | 613.1 | 400 | 3924.0 | 0.65 |
| 9 | 64.4 | 631.8 | 400 | 3924.0 | 0.67 |
| 10 | 65.0 | 637.6 | 400 | 3924.0 | 0.62 |
| 12 | 64.5 | 632.7 | 400 | 3924.0 | 0.65 |

A2) The additives of examples 13, 14 and 18 have been tested with a 4-ball machine, according to procedures of ASTM D 2783 and of ASTM D 2266 at such concentrations that the sulfur content of SAE 90 oil be 0.7% by weight. The results are reported in table 7.

It is observed that the additives according to the invention, characterized by a low corrosivity in regard to copper, may be advantageously used in the composition of gear oils and of copper metal-cutting oils, in view of their high extremepressure properties.

B1) Tests conducted with a 4-ball machine, according to the procedure of ASTM D 2783, have shown the extreme-pressure properties of the additive prepared according to example 7, used in a composition of the metal cutting-oil type.

The lubricating composition consisted of a 100 Neutral Solvent oil containing 3% by weight of chlorine as chlorinated paraffin and 1% by weight of sulfur as the sulfur-containing additive of example 7. The results are reported in table 8 hereinafter.

These results show that the solubility in 100 Neutral mineral oil of the additive according to the invention containing more than 60% by weight of sulfur is still sufficient for obtaining very high extreme-pressure performances, of particular interest in metal-working oil compositions.

B2) Tests conducted with a 4-ball machine, according to the procedure of ASTM D 2783, have shown the extreme-pressure properties of the additives prepared according to examples 14, 16 and 17, used in a composition of metal cutting-oil type.

The lubricating composition consisted of a 100 Neutral Solvent oil containing 3% by weight of chlorine as chlorinated paraffin and 1% by weight of sulfur as sulfur-containing additive. The results are reported in table 9 hereinafter.

These results show that the additives according to the invention, of high corrosivity in regard to copper, lead to very high extreme-pressure performances and may accordingly be advantageously used in iron metal-working oil compositions.

TABLE 8

| Chlorinated paraffin (% b.w) | Additive of example | S % b.w of sulfur-containing additive | % b.w of additive in oil | 4-ball E.P. tests | | | | | |
|---|---|---|---|---|---|---|---|---|---|
| | | | | Solubility in 100 N.S oil | | Load/wear index | | Load before seizing | | Welding load | |
| | | | | 20° C. | 0° C. | (kgf) | (N) | (kgf) | (N) | (kgf) | (N) |
| none | none | — | — | — | — | 21.4 | 209.9 | 50 | 490.5 | 116 | 1138.0 |
| 4.62 | none | — | — | limpid | limpid | 38.1 | 373.8 | 80 | 784.8 | 200 | 1962 |
| none | 7 | 63.8 | 1.56 | limpid | limpid | 44.0 | 431.6 | 80 | 784.8 | 315 | 3090.1 |
| 4.62 | 7 | 63.8 | 1.56 | limpid | limpid | 98.0 | 961.4 | 100 | 981.0 | 620 | 6082.2 |

TABLE 9

| Chlorinated paraffin (% b.w) | Additive of example | S % b.w of sulfur-containing additive | % b.w of additive in oil | 4-ball E.P. tests | | | | | |
|---|---|---|---|---|---|---|---|---|---|
| | | | | Load/wear index | | Load before seizing | | Welding load | |
| | | | | (Kfg) | (N) | (Kfg) | (N) | (Kfg) | (N) |
| none | none | — | — | 21.4 | 209.9 | 50 | 490.5 | 116 | 1138.0 |
| 4.62 | none | — | — | 38.1 | 373.8 | 80 | 784.8 | 200 | 1962.0 |
| none | 14 | 45.7 | 2.19 | 46.2 | 453.2 | 80 | 784.8 | 315 | 3090.1 |
| 4.62 | 14 | 45.7 | 2.19 | 97.1 | 952.6 | 100 | 981.0 | 620 | 6082.2 |
| none | 16 | 44.0 | 2.27 | 44.6 | 437.5 | 80 | 784.8 | 315 | 3090.1 |
| 4.62 | 16 | 44.0 | 2.27 | 95.0 | 932.0 | 100 | 981.0 | 620 | 6082.2 |
| none | 17 | 37.6 | 2.67 | 41.2 | 404.2 | 80 | 784.8 | 250 | 2452.5 |
| 4.62 | 17 | 37.6 | 2.67 | 89.7 | 880.0 | 100 | 981.0 | 500 | 4905.0 |

TABLE 7

| Additive of example | Load-wear index | | Welding load | | Print diameter of balls 1 h under 40 kgf (392.4 N) (mm) |
|---|---|---|---|---|---|
| | (Kgf) | (N) | (Kgf) | (N) | |
| none | 22.2 | 217.8 | 160 | 1569.6 | 0.80 |
| 13 | 60.4 | 592.5 | 400 | 3924.0 | 0.66 |
| 15 | 59.5 | 587.7 | 400 | 3924.0 | 0.68 |
| 18 | 60.0 | 592.5 | 400 | 3924.0 | 0.67 |

What is claimed as the invention is:

1. An olefin polysulfide composition of high sulfur content and a chlorine content lower than about 0.1% b.w., obtained by a process comprising the following steps of:

(1) reacting in an anhydrous medium at least one compound selected from sulfur monochloride and sulfur dichloride with at least one aliphatic monolefin of 2–12 carbon atoms, to form an adduct, (2) reacting hydrogen sulfide with sodium, potassium or ammonium hydroxide dissolved in at least one anhydrous 99.9% $C_1$-$C_4$ aliphatic monoalcohol, (3) contacting said adduct formed in step (1) and at least one monohalogenated, saturated or unsaturated hydrocarbon compound, with the alcoholic solution obtained at the end of step (2), (4) heating the resultant mixture from step (3), removing said monoalcohol, while adding a sufficient water amount to maintain in solution the reactants and the inorganic products, (5) after settling and removal of the aqueous phase, recovering the organic phase formed at least in major part of the desired olefin polysulfide composition.

2. A composition according to claim 1, wherein in step (1), 1.5 to 2.5 moles of aliphatic monoolefin are used per mole of sulfur mono- and/or dichloride and the operation is conducted at a temperature from 20 to 80° C.

3. A composition according to claim 1 wherein in step (2), 100–400 cc of aliphatic monoalcohol and 0.1–1 mole of hydrogen sulfide are used per mole of hydroxide.

4. A composition according to claim 3, wherein 0.3–0.7 mole of hydrogen sulfide is used per mole of hydroxide.

5. A composition according to claim 1, wherein the aliphatic monoalcohol is methanol and the hydroxide is sodium hyroxide.

6. A composition according to claim 1, wherein in step (2), element sulfur is added to the reaction mixture.

7. A composition according to claim 6, wherein element sulfur is introduced in a proportion up to about 3.6 moles per mole of hydroxide.

8. A composition according to claim 1, wherein in step (3), the monohalogenated hydrocarbon compound, is used in amount of 1–70% expressed as halogen gram-atoms, with respect to the adduct+monohalogenated hydrocarbon compound together, said adduct and said monohalogenated hydrocarbon compound being used in a proportion from 1/1 to 0.5/1 halogen gram-atoms per mole of hydroxide, and the temperature ranges from 20 to 120° C.

9. A composition according to claim 1 wherein the reaction of step (3) is conducted under a relative pressure up to about 1 MPa.

10. A composition according to claim 1 wherein in step (4), the temperature ranges from 50° C. to the medium reflux temperature.

11. A composition according to claim 1 whose process of manufacture further comprises a step (6) of contacting the obtained olefin polysulfide composition with a basic compound and of washing it with water.

12. A composition according to claim 1, having a chlorine content lower than about 0.05% by weight.

13. A gear oil comprising as an additive a minor proportion of composition according to claim 1 of a corrosivity, measured according to ASTM D 130 Standard, of lower than 3 at 121° C., the proportion of said composition corresponding to a 2% by weight sulfur content with respect to the oil.

14. A copper metal-cutting oil comprising as an additive a minor proportion of composition according to claim 1 of a corrosivity, measured according to ASTM D 130 Standard, of lower than 3 at 121° C., the proportion of said composition corresponding to a 2% by weight sulfur content with respect to the oil.

15. An iron metal-cutting oil comprising as an additive a minor proportion of composition according to claim 1 of a corrosivity, measured according to ASTM D 130 Standard, of lower than 3 at 121° C., the proportion of said composition corresponding to a 2% by weight sulfur content with respect to the oil.

16. A composition according to claim 1, wherein the monoalcohol in step (2) is 99.9% methanol.

17. A composition according to claim 1, wherein the chlorine content is lower than about 250 ppm.

18. An olefin polysulfide composition prepared by a process comprising (1) reacting at least one compound selected from sulfur monochloride and sulfur dichloride with at least one aliphatic monoolefin of 2-12 carbon atoms, to form an adduct, (2) reacting hydrogen sulfide with sodium, potassium or ammonium hydroxide, dissolved in at least one anhydrous 99.9% $C_1$-$C_4$ aliphatic monoalcohol, (3) contacting under anhydrous conditions said adduct formed in step (1) and at least one monohalogenated, saturated or unsaturated hydrocarbon compound, with the alcoholic solution obtained at the end of step (2), (4) heating the resultant mixture from step (3), removing said monoalcohol, while adding a sufficient water amount to maintain in solution the reactants and the inorganic products, (5) after settling and removal of the aqueous phase, recovering the organic phase formed at least in major part of the desired olefin polysulfide composition wherein the process of manufacture is continuous and operates with parallel streams and multiple contacts.

19. A composition according to claim 18, wherein the chlorine content is lower than about 250 ppm.

20. An olefin polysulfide composition of a chlorine content lower than about 250 ppm, obtained by a process comprising the following steps of:

(1) reacting in an anhydrous medium at least one compound selected from sulfur monochloride and sulfur dichloride with at least one aliphatic monoolefin of 2-12 carbon atoms, to form an adduct, (2) reacting hydrogen sulfide with sodium, potassium or ammonium hydroxide dissolved in anhydrous 99.9% methanol in an amount of 100 to 400 cc per mole of hydroxide, (3) contacting said adduct formed in step (1) and at least one monohalogenated, saturated or unsaturated hydrocarbon compound, with the alcoholic solution obtained at the end of step (2), (4) heating the resultant mixture from step (3), removing said monoalcohol, while adding a sufficient water amount to maintain in solution the reactants and the inorganic products, (5) after settling and removal of the aqueous phase, recovering the organic phase formed at least in major part of the desired olefin polysulfide composition.

* * * * *